(12) United States Patent
Wolff

(10) Patent No.: US 6,345,490 B1
(45) Date of Patent: Feb. 12, 2002

(54) AGRICULTURAL MACHINE INCLUDING A LOCKING MECHANISM FOR PREVENTING A DOUBLE-ROD RAM FROM ROTATING AROUND ITS LONGITUDINAL AXIS

(75) Inventor: Michel Wolff, Waltenheim-sur-Zorn (FR)

(73) Assignee: Kuhn S.A., Saverne (FR)

(*) Notice: Subject to any disclaimer, the term of this patent is extended or adjusted under 35 U.S.C. 154(b) by 0 days.

(21) Appl. No.: 09/415,063

(22) Filed: Oct. 12, 1999

(30) Foreign Application Priority Data

Oct. 30, 1998 (FR) .............................. 98 13834

(51) Int. Cl.[7] ................................ A01D 34/66
(52) U.S. Cl. ............................... 56/15.2; 56/10.8
(58) Field of Search .................. 56/11.9, 6, 7, 10.1, 56/10.4, 14.7, 14.9, 15.2, 15.8, 16.2, 228, 255–257; 172/273; 37/231

(56) References Cited

U.S. PATENT DOCUMENTS

| | | | |
|---|---|---|---|
| 3,957,123 A | * 5/1976 | Federspiel | .................. 172/481 |
| 4,206,580 A | * 6/1980 | Truax et al. | .................. 56/10.4 |
| 4,457,127 A | * 7/1984 | Maier et al. | .................. 56/192 |
| 4,473,993 A | * 10/1984 | Jennings et al. | .............. 56/208 |
| 4,557,104 A | 12/1985 | Toillie et al. | |
| 4,730,445 A | 3/1988 | Wolff | |
| 4,761,940 A | 8/1988 | Wolff | |
| 5,060,463 A | * 10/1991 | Jones | .................. 56/15.9 |
| 5,082,065 A | * 1/1992 | Fletcher | .................. 172/273 |
| 5,101,616 A | 4/1992 | Wolff | |
| 5,241,809 A | 9/1993 | Wolff et al. | |
| 5,353,579 A | 10/1994 | Wolff | |
| 5,353,580 A | 10/1994 | Wolff | |
| 5,419,104 A | * 5/1995 | Higdon | .................. 56/10.1 |
| 5,724,794 A | 3/1998 | Wolff | |
| 5,852,921 A | 12/1998 | Neuerburg et al. | |
| 5,857,314 A | 1/1999 | Wolff | |

FOREIGN PATENT DOCUMENTS

| | | |
|---|---|---|
| EP | 0 570 315 | 11/1993 |
| FR | 1 166 012 | 11/1958 |
| FR | 2 526 883 | 11/1983 |
| FR | 2 758 938 | 8/1998 |

* cited by examiner

*Primary Examiner*—Robert E. Pezzuto
*Assistant Examiner*—Árpád F. Kovács
(74) *Attorney, Agent, or Firm*—Oblon, Spivak, McClelland, Maier & Neustadt, P.C.

(57) ABSTRACT

An agricultural machine including a chassis, a working unit connected to the chassis by a suspension device so that the working unit can move relative to the chassis during work, at least one operating ram for raising the working unit into a transport position or lowering it into a work position relative to the chassis, and at least one lightening ram for transferring part of the weight of the working unit onto the chassis. The operating ram and the lightening ram each include a corresponding chamber formed in a same mobile cylinder, each chamber being connected to a source of fluid and the cylinder being associated with a corresponding locking mechanism for preventing the cylinder from rotating about its longitudinal axis.

20 Claims, 6 Drawing Sheets

AGRICULTURAL MACHINE INCLUDING A LOCKING MECHANISM FOR PREVENTING A DOUBLE-ROD RAM FROM ROTATING AROUND ITS LONGITUDINAL AXIS

BACKGROUND OF THE INVENTION

1. Field of the Invention

The present invention relates to the general technical field of agricultural machinery and in particular to the field of agricultural machines which comprise a working unit intended, during work, to rest at least partially on the ground and to follow the unevenness of said ground.

The invention relates more particularly to an agricultural machine of this kind which is equipped, on the one hand, with an operating device for raising the working unit into the transport position and for lowering it into the work position and, on the other hand, a lightening device for transferring part of the weight of the working unit onto the chassis.

2. Discussion of the Background

Agricultural machines of this kind, comprising:

a chassis, a working unit connected to the chassis by means of a suspension device so that it can move relative to the chassis during work, at least one operating ram for raising said working unit into the transport position or lowering it into the work position relative to the chassis, and at least one lightening ram for transferring part of the weight of the working unit onto the chassis, are already known.

The operating and lightening ram(s) is (are) connected to one (or more) source(s) of fluid, for example using rigid or flexible pipes. It is therefore important that said rams be secured appropriately to prevent them from rotating on themselves and causing the supply pipes to burst or pull out.

SUMMARY OF THE INVENTION

The present invention therefore aims to produce an agricultural machine comprising at least one operating and lightening ram that can move relative to the chassis and relative to the working unit but without being able to rotate on itself.

The objective that the present invention has set itself is achieved using an agricultural machine wherein the (each) operating ram and the (each) lightening ram each comprise a corresponding chamber formed in one same mobile cylinder, each of said chambers being connected to a source of fluid and said cylinder being associated with a corresponding locking means for preventing said cylinder from rotating about its longitudinal axis.

BRIEF DESCRIPTION OF THE DRAWINGS

Other features and advantages of the invention will emerge from the detailed description given hereafter and made with reference to the appended drawings which are given by way of nonlimiting examples and in which.

DESCRIPTION OF THE PREFERRED EMBODIMENTS

Figure 1:
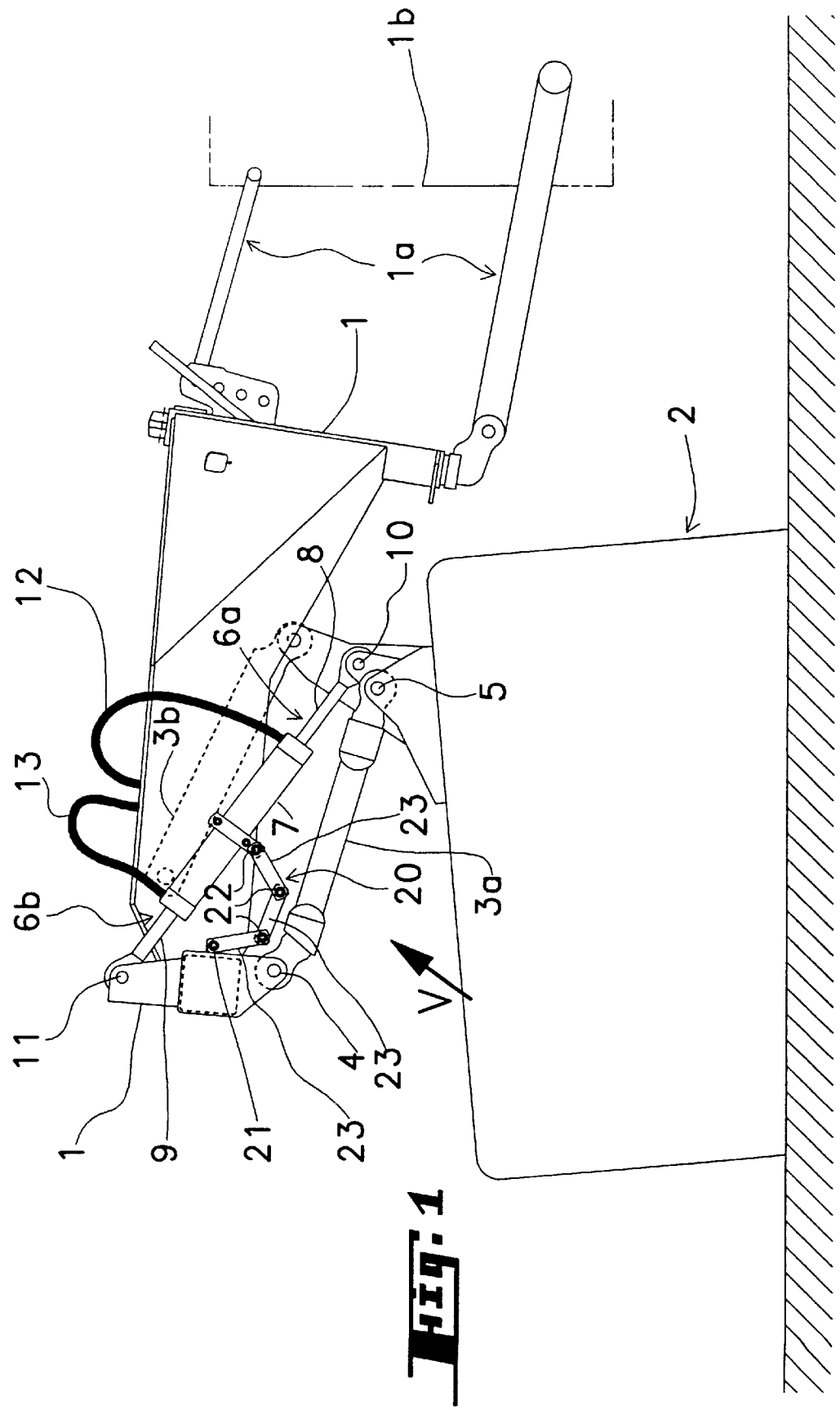
FIG. 1 depicts a side view of an agricultural machine according to the invention, in the work position.
Figure 2:
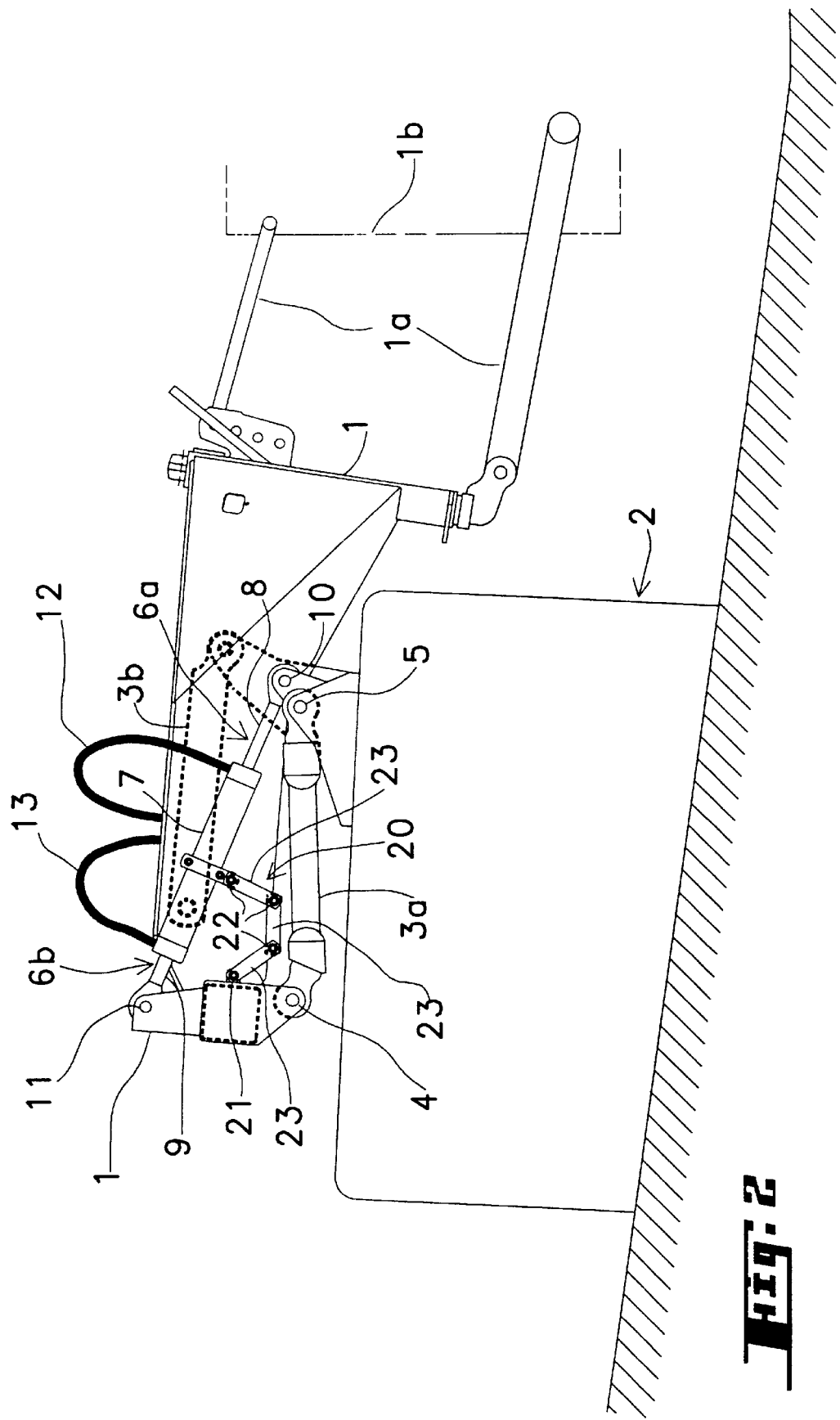
FIG. 2 depicts a side view of the agricultural machine as the working unit moves over a bump in the ground.

FIG. 1 depicts one example of an agricultural machine according to the invention, intended to be coupled to the front of a tractor vehicle. In this particular instance, the machine is a front-mounted mower. Other agricultural machines, for example trailed machines, may also be covered by the present invention.

The agricultural machine depicted in FIG. 1 comprises a chassis 1 intended to be coupled to a lifting system 1a of a tractor 1b on the one hand, and to support a working unit 2 on the other hand. The working unit 2 is connected to the chassis 1 using a suspension device so that it can move relative to said chassis 1 during work. This working unit 2 consists, for example, of a mower unit. The working unit 2 is connected to the chassis 1 with articulated arms 3a, 3b arranged, for example, one on each side of the chassis 1. Each articulated arm 3a, 3b therefore has spherical articulations 4, 5 at its ends. By way of example, the agricultural machine comprises one central articulated arm 3b and two side articulated arms 3a.

The agricultural machine according to the invention also comprises an operating ram 6a and a lightening ram 6b, these respectively allowing the working unit 2 to be positioned correctly with respect to the chassis 1 and allowing the reactions of the land or of the ground on said working unit 2 to be reduced by transferring some of the weight of the working unit 2 onto the chassis 1.

This is particularly beneficial on uneven or bumpy ground.

In the case of the agricultural machine depicted in FIGS. 1 to 4, the operating ram 6a is a hydraulic ram and the lightening ram 6b is an oleo-pneumatic ram. Each ram 6a, 6b has a corresponding chamber formed in one same cylinder 7, and a corresponding rod 8, 9.

The agricultural machine according to the invention may comprise one or more operating rams 6a and one or more lightening rams 6b. In the example depicted in the figures, the machine comprises one operating ram 6a and one lightening ram 6b on each lateral side.

The operating ram 6a thus comprises an operating rod 8, one of the ends of which is articulated to the working unit 2 at a point 10, the other end constituting a piston capable of moving inside the corresponding chamber of the cylinder 7.

The lightening ram 6b comprises a lightening rod 9, one end of which is articulated to the chassis 1 at a point 11, the other end constituting a piston capable of moving inside the corresponding chamber of the cylinder 7.

In another embodiment of the machine according to the invention, which is not depicted in the figures, the operating ram 6a may change places with the lightening ram 6b. To achieve this, all that is required is to pivot the cylinder 7 before the rods 8, 9 are mounted by way of their respective articulations 10, 11.

The cylinder 7 is advantageously mobile so that it can slide along the operating 8 and lightening 9 rods. The cylinder 7 is therefore not rigidly fixed to the chassis 1 or to the working unit 2.

Each chamber of the cylinder 7 is connected by flexible or rigid pipes 12, 13 to a source of fluid. The hydraulic and pneumatic fluid sources are, for example, those available on the tractor 1b, or alternatively, auxiliary sources mounted directly on the agricultural machine.

The agricultural machine according to the invention also comprises a locking means 20 for preventing the cylinder 7 from rotating about its longitudinal axis. The locking means 20 therefore prevents a pipe 12, 13 supplying any of the rams 6a, 6b with a fluid from breaking. Each cylinder 7 is therefore associated with a corresponding locking means 20.

The locking means 20 is fixed to the cylinder 7 and to the chassis 1 or to a part secured to said chassis 1. The locking means 20 may also be fixed to the cylinder 7 and to the working unit 2 or to a part secured to the working unit 2. Furthermore, the locking means 20 is deformable to allow the cylinder 7 to move. This locking means 20 is secured to the cylinder 7 using a collar, for example.

Advantageously, the locking means 20 is deformable in an upward-directed plane P, preferably an approximately vertical plane. The plane P approximately contains the longitudinal axis of the cylinder 7, this being so as to allow said cylinder 7 to move in the same plane P.

Figure 5:
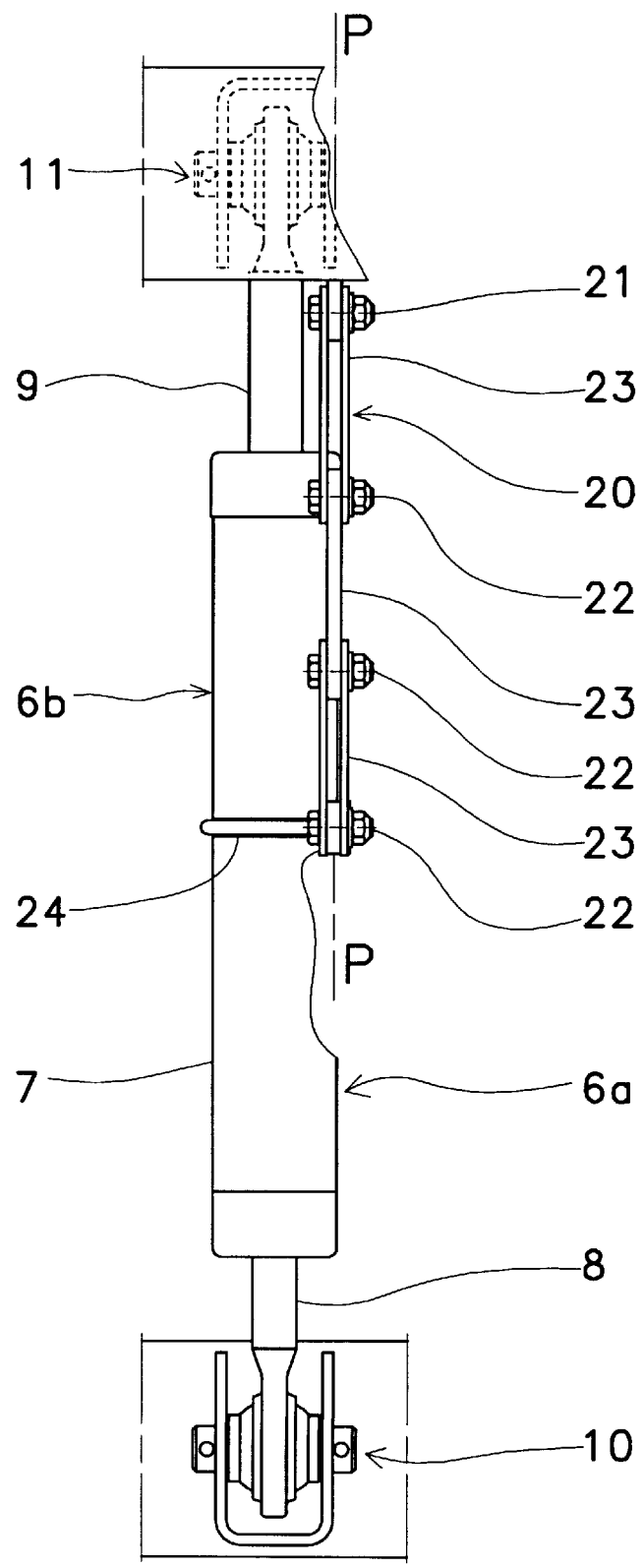
FIG. 5 depicts a view, in the direction of arrow V defined in FIG. 1, of the operating and lightening ram and of the locking means, FIG. 6 diagrammatically depicts the two operating and lightening rams and their supply circuits.

The deformation of the locking means 20 in a plane P depicted, for example, in FIG. 5, between the point of attachment to the cylinder 7 and to the chassis 1, thus prevents said cylinder 7 from rotating about its longitudinal axis.

According to one embodiment of the invention, the locking means 20 and at least one part of the cylinder 7, which part is associated with the lightening rod 9 articulated to the chassis 1 form a multi-sided polygon which is deformable in the above-defined plane P. In the example depicted in the figures, this is a six-sided polygon. This six-sided polygon has one side located between the point 11 of the chassis 1 and an articulation 21 articulating the locking means 20 to said chassis 1. A configuration using a polygon which has a different number of sides may also be envisaged without in any way departing from the scope of the present invention.

According to one embodiment of the machine according to the invention, depicted, for example, in FIG. 1, the locking means 20 comprises several rigid parts connected together by articulations 22 the geometric axes of which are roughly at right angles to the plane P of the operating 8 and lightening 9 rods. Advantageously, some of said rigid parts consist of connecting rods 23.

The locking means 20 therefore consists of an assembly of connecting rods 23 articulated together, the assembly and design of said connecting rods 23 being appropriate for limiting the risks of twisting of said assembly. The dimensions and methods of assembly are therefore chosen accordingly.

FIG. 5 depicts a view of a part of the agricultural machine according to the invention, in the direction of arrow V of FIG. 1. The locking means 20 consists of connecting rods 23 extending in the plane P, preferably directed at right angles to the plane of the figure. The cylinder 7 has been partially cut away to give a better view of the plane P, and the connecting rods 23 are alternately single and double, thus improving the rigidity of such an assembly, with regards to torsional strains. This rigidity allows the locking means 20 to prevent the cylinder 7 from rotating on itself. The locking means 20 advantageously comprises a clamp 24, by means of which it is secured to the cylinder 7. The clamp 24 consists, for example, of a clamping collar surrounding the corresponding cylinder 7.

In an additional embodiment of the agricultural machine according to the invention, and which is not depicted in the figures, the locking means 20 may be produced using a transmission chain. The links of such a transmission chain may be single links or double links.

The agricultural machine according to the invention and depicted in the figures is, for example, a front-mounted mower. Any other type of agricultural machine comprising an articulated working unit 2 may advantageously be covered by the present invention.

Figure 6:
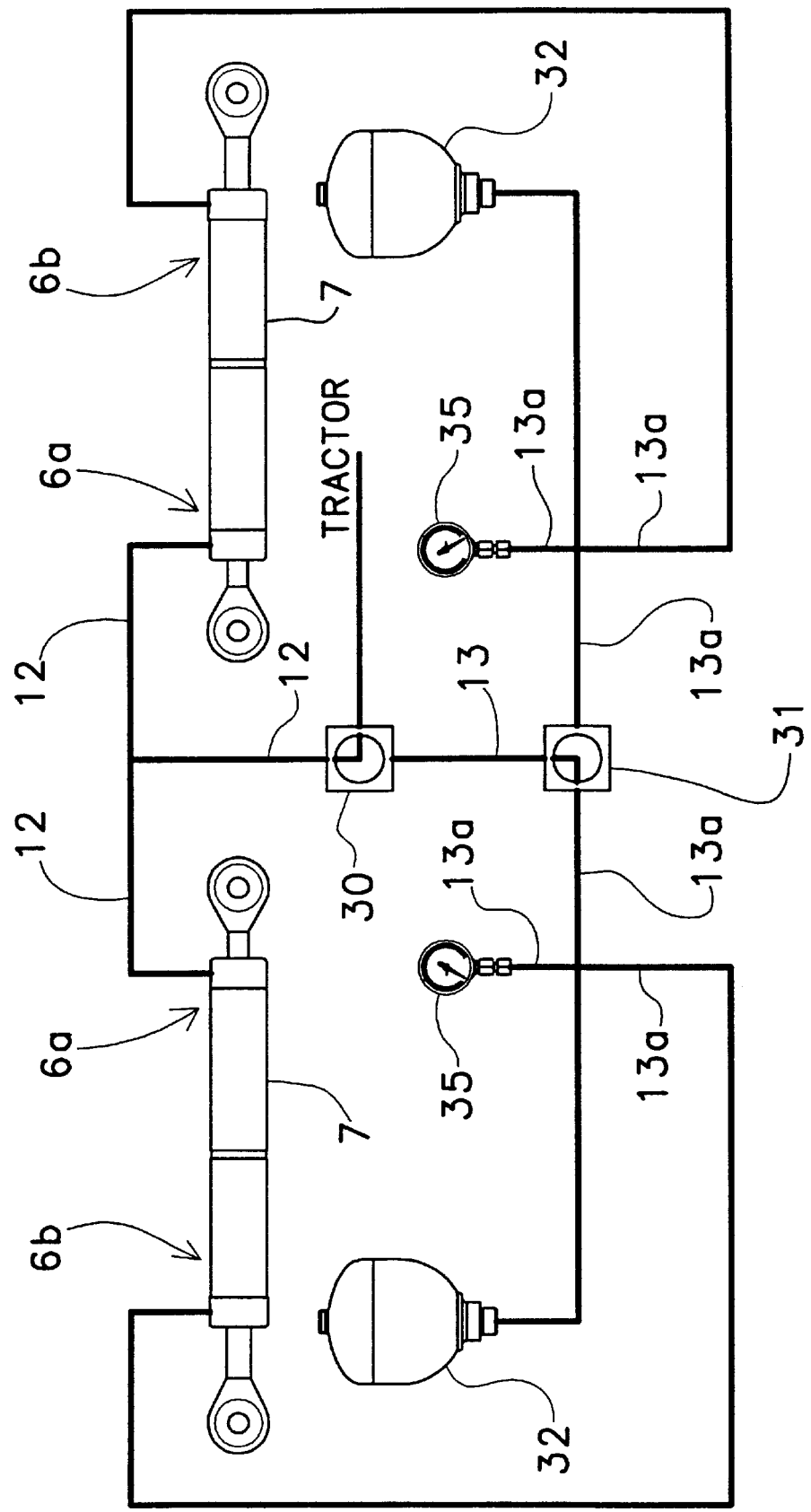

FIG. 6 depicts one embodiment of a hydraulic and pneumatic circuit of an agricultural machine according to the invention. This circuit relates in particular to an embodiment comprising two operating rams 6a and two lightening rams 6b shared between the two sides of the agricultural machine.

The operating rams 6a and the lightening rams 6b are supplied by the respective pipes 12, 13. These can be placed in communication with a hydraulic source of the tractor by a first multi-position hydraulic distributor 30.

The hydraulic circuit also comprises a second three-position hydraulic distributor 31 placing the hydraulic source in communication with one or other of the lightening rams 6b, via the pipe 13 and the first distributor 30.

When the second distributor 31 is in one of its positions, the pipe 13 allows the lightening ram 6b, a gas accumulator 32 and a pressure gage 35 to be supplied. For this purpose, the pipe 13 is divided into three branches 13a.

Each gas accumulator 32 contains a predetermined pressure of gas, for example nitrogen, so as to transfer at least part of the weight of the working unit 2 onto the chassis 1. The amount of lightening obtained is therefore determined by the amount of oil let into each gas accumulator 32, and this is achieved by appropriate positioning of the first and second distributors 30, 31. The lightening can therefore be selected to suit various working conditions. A different pressure may also be obtained in one of the gas accumulators 32 compared with the other, this being so as to compensate for an uneven distribution of the weight of the working unit 2.

Figure 3:
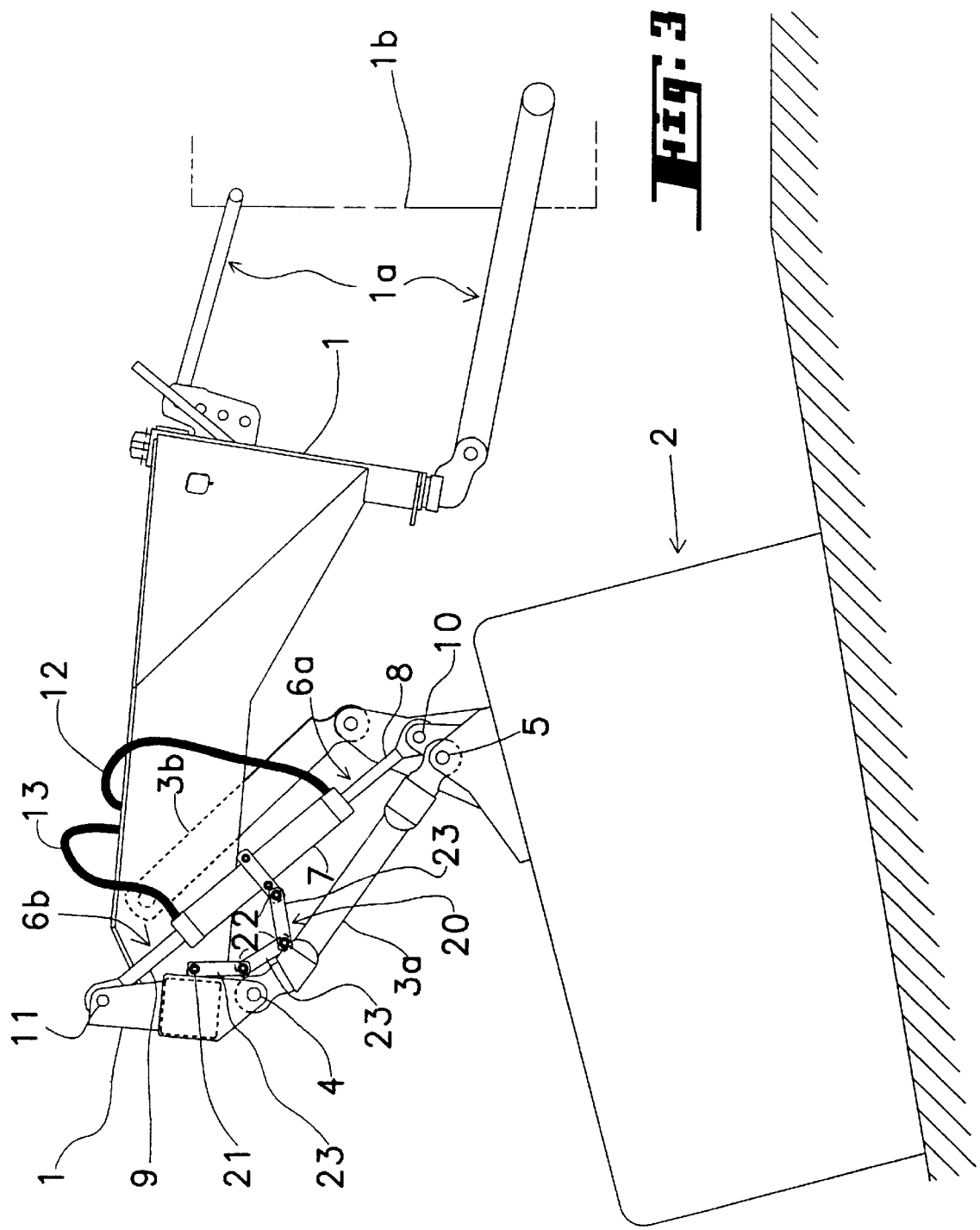
FIG. 3 depicts a side view of the agricultural machine as the working unit moves over a hollow in the ground.
Figure 4:
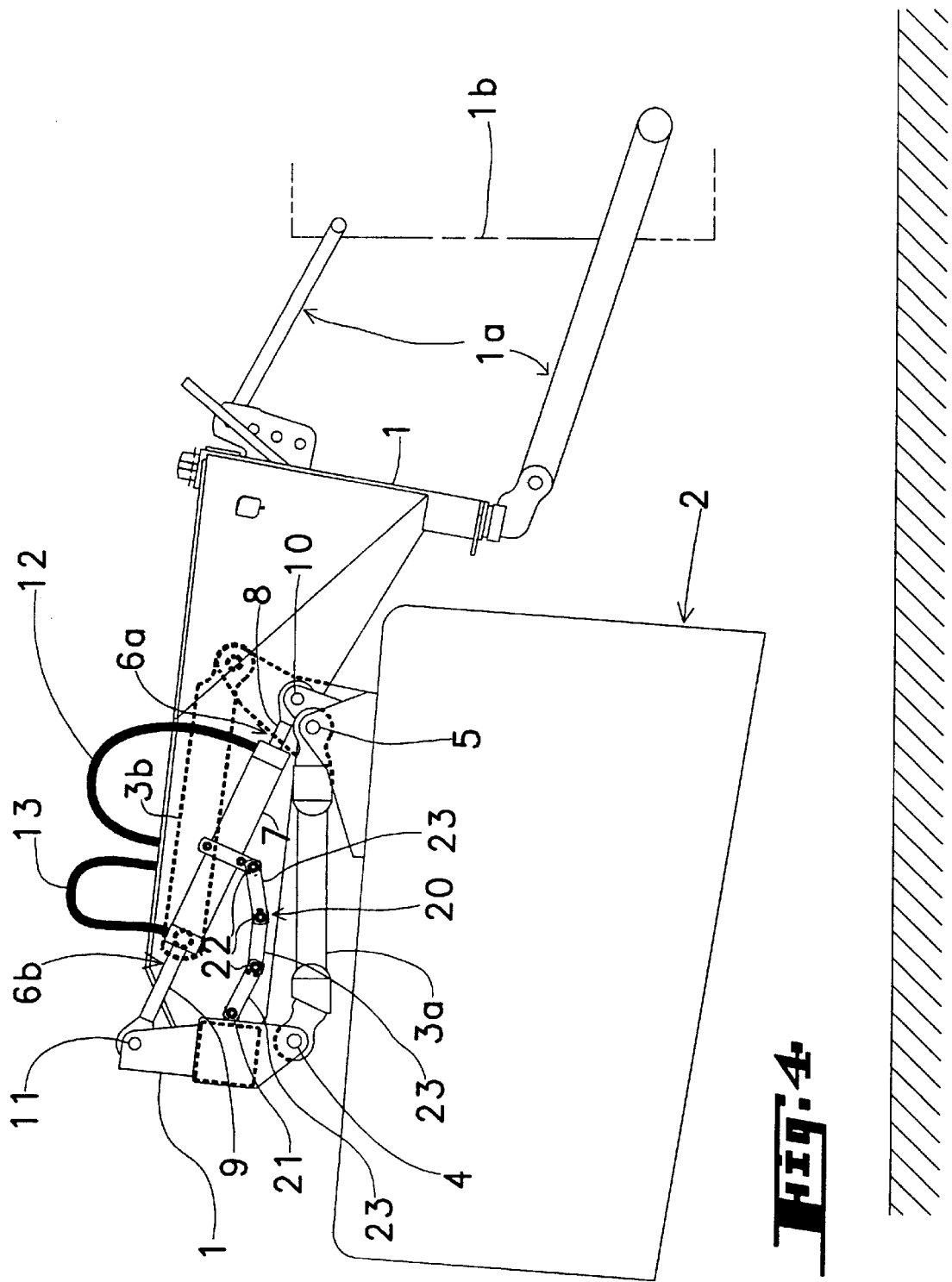
FIG. 4 depicts a side view of the agricultural machine in the transport position.

When the working unit 2 is in the work position, the operating rod 8 is advantageously in abutment and in a position of maximum extension, while the lightening rod 9 is approximately halfway along its stroke inside the corresponding chamber of the cylinder 7. Each gas accumulator 32 also makes it possible, when the lightening rod 9 is not positioned in abutment in its corresponding chamber, to absorb shocks or abrupt movements to which the working unit 2 is subjected. The lightening rod 9 comes into abutment only when the working unit 2 is in the raised position (FIG. 4) or when it is in the fully lowered position (FIG. 3).

The agricultural machine according to the invention consists, for example, of a mower of the mounted or trailed type, with or without a device for treating the cut product. A machine, such as a public-works machine or landscape gardening machine may also be covered by the present invention.

What is claimed as new and desired to be secured by Letters Patent of the United States is:

1. An agricultural machine comprising:
   a chassis,
   a working unit connected to the chassis by means of a suspension device so that said working unit can move relative to the chassis during work,
   at least one operating ram for raising said working unit into a transport position or lowering said working unit into a work position relative to the chassis;

and at least one lightening ram for transferring part of the weight of the working unit onto the chassis, wherein:

the at least one operating ram and the at least one lightening ram each comprise a corresponding chamber formed in a same mobile cylinder and having a longitudinal axis, each of said chambers being connected to a source of fluid; and said cylinder is associated with a corresponding locking means for preventing said cylinder from rotating about said longitudinal axis.

2. Agricultural machine as claimed in claim 1, wherein the at least one operating ram is a hydraulic ram and the at least one lightening ram is an oleo-pneumatic ram.

3. Agricultural machine as claimed in claim 1, wherein the at least one operating ram comprises an operating rod, wherein:

one end of said operating rod is articulated to the working unit or to the chassis; and another end of said operating rod constitutes a piston capable of moving inside the corresponding chamber formed in the corresponding cylinder.

4. Agricultural machine according to claim 1, wherein the at least one lightening ram comprises a lightening rod:

one end of said lightening rod is articulated to the chassis or to the working unit; and another end of said lightening rod constitutes a piston capable of moving inside the corresponding chamber formed in the corresponding cylinder.

5. Agricultural machine as claimed in claim 1, wherein the locking means is deformable and is fixed, on one hand, to the corresponding cylinder and, on another hand, to the chassis or to the working unit.

6. Agricultural machine as claimed in claim 5, wherein the locking means is deformable in an upward-directed plane P.

7. Agricultural machine as claimed in claim 6, wherein the plane P approximately contains the longitudinal axis of the corresponding cylinder.

8. Agricultural machine as claimed in claim 6, wherein the locking means comprises rigid parts connected together by articulations, each of said articulations having a geometric axis approximately at right angles to the plane P.

9. Agricultural machine as claimed in claim 8, wherein at least one of said rigid parts comprises connecting rods.

10. Agricultural machine as claimed in claim 9, wherein said connecting rods comprise links of a portion of a transmission chain.

11. Agricultural machine as claimed in claim 5, wherein the locking means further comprises a clamp configured to fix said locking means to said mobile cylinder.

12. Agricultural machine as claimed in claim 11, wherein the clamp comprises a clamping collar surrounding the corresponding cylinder.

13. Agricultural machine as claimed in claim 1, wherein:

said agricultural machine is a mower intended to cut a product.

14. Agricultural machine as claimed in claim 13, wherein said mower is a front-mounted mower.

15. Agricultural machine as claimed in claim 6, wherein the plane P is a vertical plane.

16. Agricultural machine as claimed in claim 13, wherein said mower comprises a device for treating said cut product.

17. An agricultural machine comprising:

a chassis;

a working unit connected to the chassis, at least one operating ram configured to raise said working unit into a transport position and lowering said working unit into a work position relative to the chassis, said at least one operating ram comprising a first chamber formed in a mobile cylinder having a longitudinal axis;

at least one lightening ram configured to transfer part of the weight of the working unit onto the chassis, said at least one lightening ram comprising a second chamber formed in said mobile cylinder; and a locking mechanism configured to prevent said mobile cylinder from rotating about said longitudinal axis.

18. An agricultural machine according to claim 17, wherein said at least one operating ram comprises an operating rod having a first end connected to one of the working unit and the chassis, and a second end configured to move inside said first chamber.

19. An agricultural machine according to claim 17, wherein said at least one lightening ram comprises a lightening rod having a first end connected to one of the chassis and the working unit, and a second end configured to move inside said second chamber.

20. An agricultural machine according to claim 17, wherein:

said locking mechanism is deformable within a plane, a first end of said locking mechanism is fixed to said mobile cylinder, and a second end said locking mechanism is fixed to one of the chassis and the working unit.

\* \* \* \* \*